(No Model.)
W. W. DOOLITTLE.
TAPPING MACHINE.
No. 489,224. Patented Jan. 3, 1893.
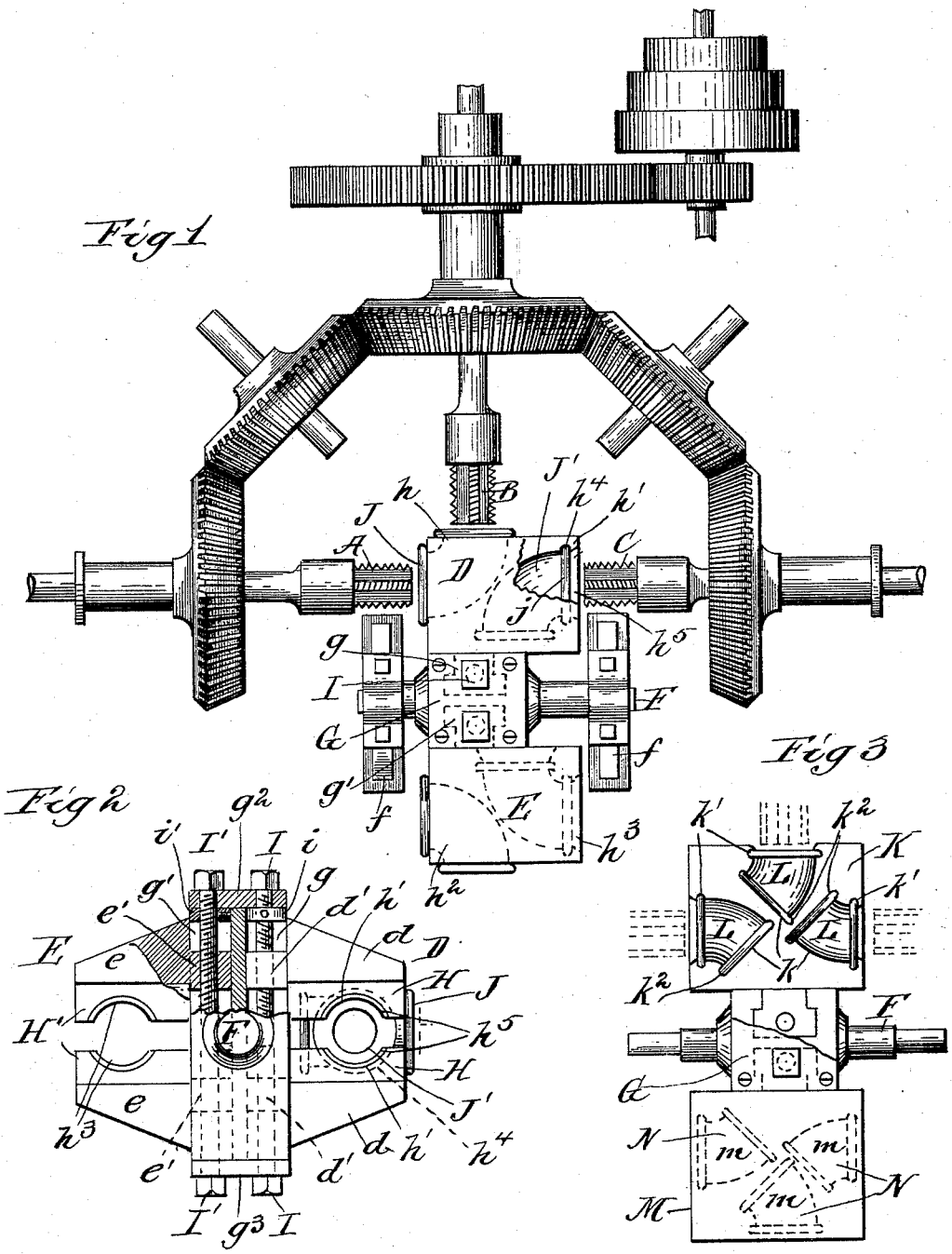
Witnesses
W. C. Coolies
John W. Adams
Inventor
William W. Doolittle
By Coburn & Thacher
Att'ys

UNITED STATES PATENT OFFICE.

WILLIAM W. DOOLITTLE, OF CHICAGO, ILLINOIS, ASSIGNOR TO THE CRANE COMPANY, OF SAME PLACE.

TAPPING-MACHINE.

SPECIFICATION forming part of Letters Patent No. 489,224, dated January 3, 1893.

Application filed July 16, 1892. Serial No. 440,209. (No model.)

*To all whom it may concern:*

Be it known that I, WILLIAM W. DOOLITTLE, a citizen of the United States, residing at Chicago, in the county of Cook and State of Illinois, have invented certain new and useful Improvements in Tapping-Machines, which are fully set forth in the following specification, reference being had to the accompanying drawings, in which—

Figure 1, represents a plan view of a tapping machine embodying my improvements with some parts broken away. Fig. 2, a side elevation of the chuck, the upper part being broken away. Fig. 3, a plan view of the chuck partly broken away and representing a modification in construction.

My invention relates to a machine for tapping pipe elbows, and its object is to provide for utilizing the three taps of a machine, organized as usual, instead of using two only and so leaving one idle, which is the ordinary practice heretofore known.

I will now describe in detail the construction and operation of a tapping machine embodying my invention in a practical way and will then point out more definitely in claims the particular improvements which I believe to be new and wish to secure by Letters Patent.

In the machine shown in the drawings there are three taps, A, B, and C; the first and last standing opposite to each other and the second at right angles thereto; this is a common arrangement of the taps in which position they are adapted for tapping T heads in which work, of course, all three are used. The taps are rotated as required by suitable gear; this is shown in the drawings, but it is of ordinary and well known construction and arrangement, and so, requires no special description here. With these taps, a chuck is used which is constructed to receive and hold the fittings while being tapped. In tapping Ts, the chuck is constructed to hold the T heads so that the three taps will enter the three openings respectively, and cut the thread therein; but heretofore in tapping elbows, the chuck has been constructed to take only one piece arranged so that two of the taps at right angles to each other will cut the two openings of the elbows and the other tap performs no useful work during the entire operation. In my improvement the chuck is constructed to receive two or more elbows which are seated so that all three of the taps will perform actual work. As seen in Figs. 1 and 2, of the drawings, the chuck is constructed for L, or right angled elbows. This device as a whole is a double chuck, or one with two twin members. The two separate chucks, D and E, are mounted on a single horizontal shaft, F, supported in standards, *f*, so that the entire chuck device may be revolved in a vertical plane. On the shaft, F, there is fixed a strong support, G, arranged at right angles to the shaft and extending across the same diametrically; on each face this support is provided with T grooves, $g$ and $g'$, running its entire length. The clamping plates, *d*, are mounted on this support by means of T head projections, $d'$, as seen in Fig. 1. The chuck plates, H, are arranged between these two clamp plates, as usual, and are held in place and adjusted on the support by means of screws, I, which pass through fixed plates, or heads, $g^2$, on the ends of the support, G; the screws are held from longitudinal movement by means of collars, *i*. The companion chuck, E, is of the same construction; with clamp plates, *e*, connected to the support by similar projections, $e'$, entering and movable in the T groove, $g'$, and with like chuck plates, H', secured by stationary heads, $g^3$, bolts, I', provided with collars, $i'$, the same as with the chuck plates, H. It will be understood, of course, that the standards on which the chucks are mounted are arranged with reference to the tap spindles, in such a way that, as the chuck shaft is turned, one or the other of the chucks may be brought into proper position between the taps for the performance of the work required of the latter. The chuck plates, H, are constructed with two seats, *h*, *h'*, each adapted to receive a right angled or L shaped elbow; one of these seats, *h*, is at one of the outer corners of the chuck, arranged so that the elbow, J, held therein, will be presented to the action of the taps, A and B, when the chuck, D, is brought into proper position; the other seat, *h'*, is at the corner of the chuck diagonally opposite the former, so that in the same working position of the chuck, the elbow, J', in this seat will have one of its openings presented properly for the action of the tap, C, as seen in Fig. 1 of the drawings. The chuck plates, H', are provided with similar seats, $h^2$, $h^3$, arranged the same as the seats in the chuck plates, H. It will be understood, of course, that these elbow seats are made one-half in each plate, in the usual way, and as illustrated in Fig. 2 of the drawings, and the elbows are properly secured between the plates by means of the adjusting screws which move the plates to and from each other. Now, suppose the chuck shaft to be turned so as to bring the chuck, D, into working position within the taps, as seen in Fig. 1 of the drawings. It is obvious that the elbow, J, will be tapped at each opening, as usual, and that the elbow, J', will also be tapped at one end. The chuck shaft is now given a one-half rotation thereby bringing the chuck, E, into working position, when the same operation is repeated, and during this work, the chuck, D, is opened, a new elbow put in place of the completed elbow, J, and the elbow, J', reversed in position. Upon a second half revolution of the chuck device, it is obvious that the tapping of the elbow, J', will be completed, while the third elbow substituted for, J, is being tapped, and during this operation the change of elbows in the chuck, E, is made, as already described for the chuck, D. It will be seen then that work from the three taps is always secured, and that, at each adjustment of one of the chucks to the spindles, one elbow is completely tapped and another one half tapped, so that with two presentations of the same chuck to the taps, three elbows will be tapped instead of two, as heretofore.

It may be desirable to provide special means for holding the elbow, J', firmly in position in the chuck, and I have shown in Fig. 1, a construction for this purpose; an internal groove, $h^4$, is formed around the seat just inside the end openings therein, adapted to receive the bead, j, of the respective ends of the elbow and the edge of the chuck plates around the seat opening outside of this groove is provided with a slight bevel, $h^5$; it will be seen then that the elbow is firmly held between the two grooves.

In Fig. 3, a modification in the construction of the chuck is shown whereby the mechanism is adapted for operation upon what are known as forty-five-degree elbows. In this construction, the main parts of the chuck device are the same as already described, but the chuck plates are provided with three seats so as to take three of the short elbows; the plates, K, of the chuck, on one side of the shaft, are provided with three seats, k, arranged at three sides of the chuck to correspond with the arrangement of the three taps which is the same as in Fig. 1; these seats are provided with both outer grooves, $k'$, and inner grooves, $k^2$, so as to take both beads of the elbows, L, whereby the latter are firmly held in their seats. The chuck plates, M, of the opposite, or twin chuck, are constructed in the same way being provided with three seats, m, which are arranged and adapted to receive, in like manner, three forty-five-degree elbows, N. Obviously, under this arrangement, the three taps are all operated, each one cutting one end of an elbow; upon the reversal of the chuck, it is opened and the three elbows reversed while the taps are at work upon another set of elbows in the companion chuck, and when the first chuck is brought again to the taps, the three elbows therein will be finished; it will be seen, therefore, that with two presentations of either one of the chucks to the taps, three of these short elbows will be finished.

From the above description, it is evident that with my invention, each one of the three taps, arranged in the well known way, is brought into effective operation in tapping elbows; there is, therefore, no necessity of a machine constructed with two taps, for tapping elbows, and the work done by an ordinary three tap machine is largely increased.

Having thus described my invention, what I claim as new and wish to secure by Letters Patent is:—

1. In a tapping machine, three taps arranged, as described, in combination with chucks provided with chuck plates having separate seats for several independent pipe elbows arranged to provide for work by each one of the taps, upon some one of said elbows, whereby the operation of tapping is performed on several elbows simultaneously, substantially as described.

2. In a tapping machine the three taps, A, B, and C, arranged as described, in combination with the chucks, D and E, provided with chuck plates, H, H', having seats, h, h', and $h^2$, $h^3$, adapted to take two elbows J, J', substantially as described.

WILLIAM W. DOOLITTLE.

Witnesses:
ALOYSIA HELMICH,
H. D. HOLLISTER.